INVENTORS
JAMES R. THURSTON
RICHARD P. KING
BY Thomas W. Brennan
AGENT 3,217,489
ROCKET MOTOR IGNITION SYSTEM
James R. Thurston, Brigham City, Utah, and Richard P. King, Huntsville, Ala., assignors to Thiokol Chemical Corporation, Bristol, Pa., a corporation of Delaware
Filed Nov. 15, 1961, Ser. No. 152,699
8 Claims. (Cl. 60—35.6)

This invention relates to rocket motor ignition systems and more particularly to ignition systems which are used to ignite a plurality of rocket motors simultaneously, smoothly and safely.

Heretofore it has been the practice in igniting a plurality of rocket motors such as is employed in clustered boosters to utilize one or two main types of ignition systems; namely, individual pyrotechnic igniters of black powder or metal-oxidant pellet compositions located within each rocket motor and ignited by electrically coupled and actuated squibs, or individual, solid propellant, relatively small size rocket motors similarly ignited by electrically coupled squibs or igniters and arranged so as to exhaust their high temperature combustion gases into each of the plurality of larger rocket motors for ignition thereof.

Both of the above described systems although much used present problems which limit their usefulness in a clustered booster application. Primary among these problems is the failure to obtain simultaneous ignition of all engines comprising the cluster. Another problem is partial ignition, i.e., one or more engines fail to ignite. Mishaps such as above noted are causes of abortive missile missions (including erratic launch) or outright disaster, especially in very large boosters.

Accordingly, it is an object of this invention to provide an ignition system for a plurality of rocket motors which generally minimizes or prevents the likelihood of individual rocket motor misfire by promoting simultaneity of ignition of all motors.

Another object of this invention is to provide an ignition system for a plurality of motors wherein the means for ignition stems from a single source.

Still another object of this invention is to provide an ignition system of the type referred to which is characterized by its reliability and inherent safety by elimination of highly sensitive pyrotechnic materials for ignition purposes within the motor confines.

A further object of this invention is to provide an ignition system of the type described in which one or more rocket motors in a plurality thereof is itself utilized to provide the ignition means for the remainder of the motors.

A still further object is to provide an ignition system which after use is not required to be carried as part of the vehicle inert weight, thereby permitting increased missile payloads, by being part of the launching system and there retained after missile "lift-off" or launching.

The foregoing and other objects will become more apparent to one skilled in the art to which the invention pertains from the following detailed description taken in conjunction with the accompanying drawings in which.

Figure 1:
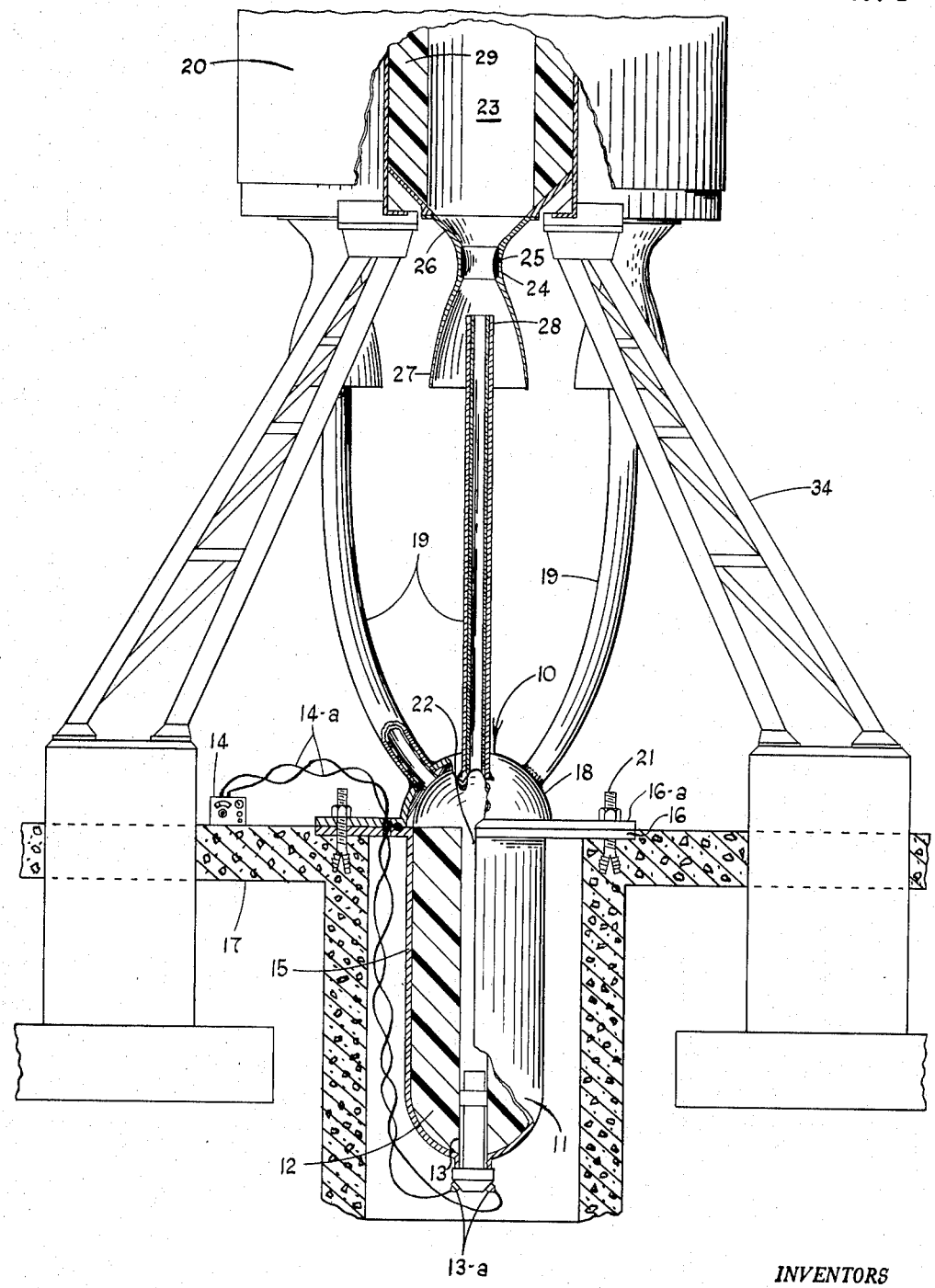
FIG. 1 is a pictorial elevation partially in cross-section of a typical clustered booster utilizing the invention.

Referring to the drawings, and in particular to FIG. 1 the ignition system 10 comprises a high temperature gas source in the form of a gas generator 11 which provides high temperature gases by the combustion therein of a combustible material such as solid propellant 12. For initiating combustion of the solid propellant 12 an igniter 13 is used which is itself initiated by electrically actuated pyrotechnic squibs 13–a through electrical leads 14–a from supply source 14. For purposes of illustration herein gas source or generator 11 has a cylindrical outer body 15, a closed bottom end and a shoulder or flange 16. Flange 16 bears upon the surface of the launching complex or pad 17 and is fixedly attached thereto by lag bolts 21. Launching pad 17 is constructed with a suitable cavity for holding gas generator 11 during operation.

Directly above flange 16 and attached thereto by bolts 21 and flange 16–a or other gas tight attachement means is a high temperature gas collector, reservoir or plenum chamber 18. Extending upward from chamber 18 is a conduit system comprising a plurality of pipes, hollow conduits or ducts 19 in communication with the interior of the plenum chamber 18. As shown in the figures conduits or pipes 19 terminate interiorly of each rocket motor 23 which together comprise clustered booster 20.

Flange 16 together with lagging bolts 21 and flange 16–a of chamber 18 are shown as one means for holding generator 11 in place although many others will be apparent to one skilled in the art. Exit 22 establishes communication between the solid propellant 12, which is suitably bonded to the interior walls of the cylindrical body 15, and chamber 18 interior.

As shown in FIG. 1, pipe or conduits 19 have outlets 28 which terminate at a point substantially within the interior of each rocket motor 23 which comprises an exhaust nozzle 24, a throat portion 25, a converging portion 26 and a diverging portion 27. Exact termination of conduit outlets 28 is preferably at a point below (or downstream of) throat portion 25 and converging section 26 and within diverging section 27.

Outlets 28 are gas flow controllers and are intended functionally to accelerate the gas flowing from the plenum chamber 18 through the conduit system 19, to sonic or above velocity as a matter of preference. They may therefore be considered to be constrictions, orifices, valves, nozzles or similar devices dependent upon the desired end result. It is important that sufficient velocity be imparted to the gases so that sufficient penetration of the rocket motor interiors is achieved, thereby insuring contact with combustible materials such as solid propellant 29 for ignition purposes.

Figure 2:
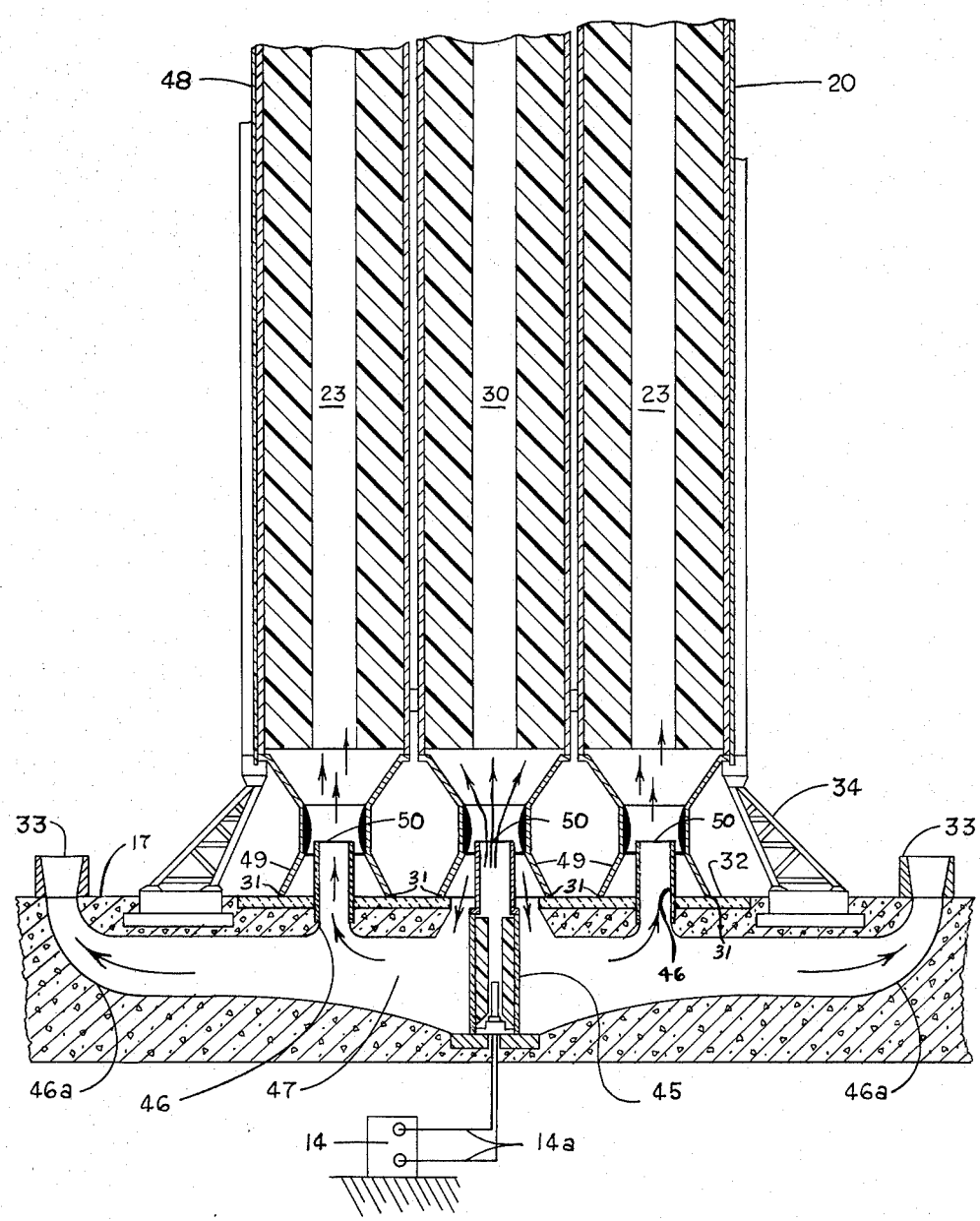
FIG. 2 is an elevation in cross-section of a portion of a typical clustered booster embodying another form of the invention.

In FIG. 2 is shown another embodiment of the invention comprising the motor igniter 45, electrical supply source 14 and leads 14–a, ducts, pipes or conduits 46, and a reservoir or plenum chamber 47. In this embodiment conduits or ducts 46 are envisioned as being embedded within the concrete or other heat resistance material comprising the launching complex or pad 17. In addition, cluster 48 (three motors thereof shown for clarity) has a central motor 30 (although not restricted to a central motor) which has its exit nozzle 49 resting directly on a launching pad refractory surface 32. Refractory surface 32 can be in-laid for convenience as shown, and of sufficient smoothness of finish to provide adequate sealing at the periphery 31 of exit nozzle 49. Conduits or ducts 46 extend from the reservoir or plenum chamber 47 and terminate interiorly of the rocket motor exhaust nozzle 49 and have an outlet 50 for controlling the gas flow velocity as before (arrows FIG. 2). Also included in FIG. 2 are venting passages 33 for venting overboard excess high temperature gas obtained from the central motor 30. Finally a support for the clustered booster prior to and during launching is provided by the frame work or support 34 (FIGS. 1 and 2).

Figure 3:
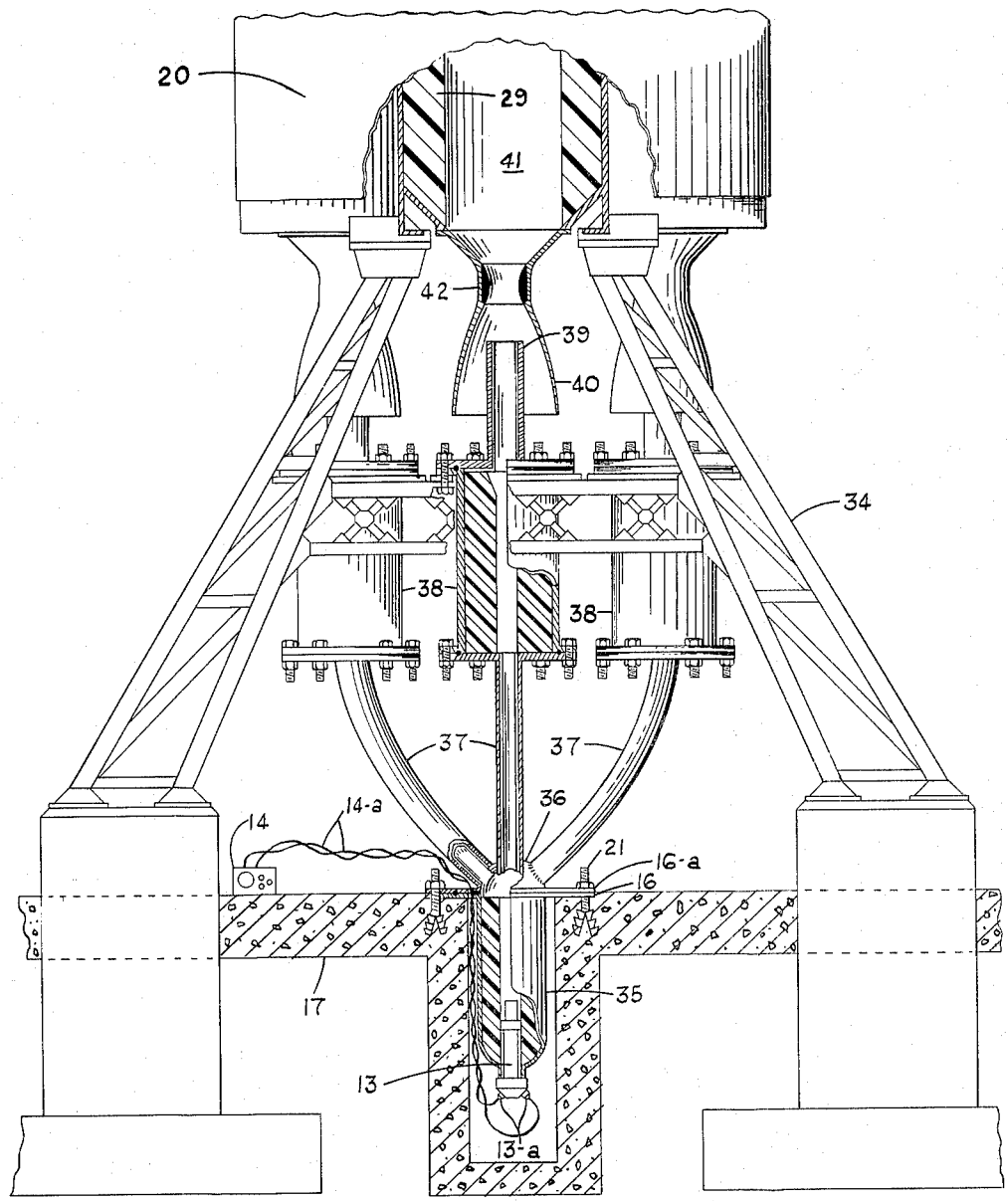
FIG. 3 is a pictorial view partially in cross-section of still another embodiment of the invention showing the important features.

FIG. 3 shows a somewhat different arrangement of the invention comprising a high temperature gas source in the form of gas generator 35 (which may for convenience be centrally located) electrical source 14 and leads 14–a, a plurality of intermediately positioned augmenting high temperature gas generators 38, a high temperature gas collector, reservoir or plenum chamber 36, and a conduit system comprising a plurality of hollow conduits or ducts 37 extensible from the plenum chamber 36 to the bottom or upstream end of augmenting gas generators 38. Outlets 39 are also provided as before and are positioned terminally on said conduits 37, and protrude into the rocket motor exhaust nozzles 40, terminating downstream of nozzle throat 42 of the rocket motors 41 comprising the clustered booster.

Operation of the ignition system 10 of the invention of FIG. 1 commences with the closing of a suitable electric switch (not shown) whereby electric power conducted from power supply source 14 to pyrotechnic squibs 13–a through electrical leads 14–a ignites the squib 13–a and initiates igniter 13 creating a high temperature deflagration which is transmitted to the combustible material 12 which may be solid propellant contained in high temperature gas source or generator 11 for combustion thereof. Combustion of the solid propellant 12 generates large volumes of high temperature gas and causes the pressure within the chamber or body 15 to rise whereupon the gas thus obtained flows into the reservoir or plenum chamber 18 through exit 22 completely filling the chamber. From the plenum chamber 18 the gas simultaneously flows through each of the conduits 19, and is emitted as a high velocity preferably, supersonic, stream from outlets 28 onto the surface of the solid propellant 29 in motors 23. By the provision of reservoir or plenum chamber 18 the quantity of high temperature gas made available to each motor for ignition thereof is assured. However, in many instances it may only be necessary to enlarge a section of conduit or pipe and connect the conduits thereto for conducting the gases to the motor interiors. By means of outlets 28 high temperature gas pressure in the system is controlled and its flow rate proportioned so as to obtain simultaneous arrival (and therefore ignition) in each motor. Thus, as a matter of practicality the clustered booster is successfully and safely ignited with little or no deleterious ignition effects and successful missile lift-off achieved.

Similarly with the invention set forth and illustrated in FIG. 2, as motor igniter 45 is initiated it in turn ignites motor 30 of booster 20 which results in the generation of large volumes of high temperature gas which enter reservoir or plenum chamber 47 completely filling it. However, since thrust produced by a single motor when in a cluster such as herein contemplated is generally insufficient to lift-off the as yet unignited booster, the high temperature gas flowing from motor 30 is more or less forced to flow into reservoir or plenum chamber 47 since an effective seal is provided at the edge of the motor 30 exhaust nozzle 49 and refractory surface 32 by the weight of motor 30 which though supported by framework 34 and the thrust produced by its burning propellant also bears against surface 32 with sufficient force to prevent gas escape. From reservoir 47 the gas from central motor 30 is conducted through conduits 46 to outlets 50. Outlets 50 perform a similar function to those of the earlier described systems in that the remaining motors are thereby simultaneously ignited completing the operation. In addition, since motor 30 may in some instances produce excessive amounts of high temperature gas, additional conduits 46–a are provided with outlets 33 for venting the excess gas overboard and preventing excessive back pressure in the engine 30. As the vehicle in which the clustered booster is installed lifts off the launching pad 17, additional back pressure relief is provided by the separation of exhaust nozzles 49 from the surface 32.

In FIG. 3 a slightly different configuration is presented. In this form operation of the invention is as follows. Ignition of primary high temperature gas source or generator 35 is effected as hereinbefore described by electrical power source 14 and leads 14–a. The gas enters reservoir or plenum chamber 36 completely filling it. From there it flows through conduits 37 to secondary combustible material containing gas source or generators 38. The combustible material, which may be solid propellant, in gas generator 38 is simultaneously ignited by the primary high temperature gas conducted thereto and additional, augmenting high temperature gas is created. The augmented gas flows through outlets 39 and simultaneously ignites the rocket motors 41 as in the earlier described embodiments.

Although the invention has been illustrated in its several embodiments as an ignition system for solid propellant motors and clusters thereof, it has equal applicability to liquid propellant motors with only minor changes. Furthermore, when the ignition system of this invention is properly fitted with appropriate piping, supply lines and valving which is presently available to those skilled in the art, operation may also be achieved with liquid combustibles in the high temperature gas sources or generators described above. Thus in its preferred forms as herein described, inexpensive, easily installed, highly reliable and safely operated ignition systems, presently unavailable, are achieved.

In the foregoing embodiments of the invention it is particularly important to note that in putting the invention into practice, care be taken to insure that the placement of the conduit outlets with respect to the interior of the rocket motors to be ignited is best suited for ignition and smooth rocket motor chamber pressure rise. For this reason all outlets are shown in a position sufficiently downstream of the motor throat and in the expansion or diverging section to insure that adequate area therein is available to (1), allow the rocket motor exhaust gases to leave the chamber relatively unobstructed and (2), prevent too rapid a rise in chamber pressure which may occur should the outlets of the ignition system protrude further into the motor nozzle. At the same time the velocity of the high temperature gases leaving the outlets is sufficiently high to allow a large area of the rocket motor interior to be exposed thereto insuring ignition. High temperature gas velocity with proper design extends to the sonic level and above and in fact such design is contemplated herein for best mode of operation.

An important advantage obtainable by the use of this invention stems from the fact that as conceived it is not necessarily part of the missile flight system, i.e., it is not necessarily "flight hardware," but may remain on the ground or be "launcher retained." Therefore, in such use the system components comprising the invention can be over-designed to insure more reliability; the gas generating sources can be oversized, to provide substantially equal gas flow conditions in each conduit pipe or duct; wall thickness and material thereof can be selected for safest operation to withstand the high gas temperatures and pressures envisioned without regard to weight; and finally, increased missile or space vehicle payloads are permitted.

In addition to the advantages set forth herein over prior art devices, one further advantage is importantly inherent in this invention, namely, that of the achievement of reliable, simultaneous ignition of a plurality of rocket engines without the accompaniment of harmful and/or excessive pressure rise on ignition which is a characteristic of prior art devices. The ignition system of this invention permits a continuous high temperature flow of gas at sonic and higher velocities when properly constructed in accordance herewith for sufficient periods so that, as a matter of practicality, misfires are eliminated and a smooth, controllable pressure buildup in the rocket chambers being ignited is brought about.

The invention as set forth herein should not be construed as limited to the description of the particular embodiments presented and should not be limited in scope except in accordance with the subtended claims.

What is claimed is:

1. A high temperature gas ignition system for simultaneously igniting a plurality of rocket motors comprising at least one high temperature gas producing rocket motor, and conduit means in gas conducting communication with said rocket motor and with the interiors of said plurality of rocket motors for simultaneous ignition thereof by said high temperature gas produced by said rocket motor.

2. The ignition system of claim 1 wherein the conduit means comprises a plenum chamber in communication with said high temperature gas producing rocket motor, and a plurality of conduits extensible therefrom and terminating interiorly of said plurality of rocket motors.

3. The ignition system of claim 2 wherein the conduit means communicates with the interiors of said plurality of rocket motors through gas flow control outlets.

4. The ignition system of claim 2 wherein the gas flow control outlets are nozzles.

5. A high temperature gas ignition system for simultaneously igniting a plurality of rocket motors comprising a high temperature gas producing rocket motor, conduit means communicating with said motor comprising a plenum chamber, a plurality of ducts extensible therefrom and terminating interiorly of said plurality of rocket motors, venting means communicable with said chamber for venting excess gas from said gas producing motor, and gas flow control outlet means joined to the terminal portions of said ducts so as to direct said high temperature gas to the interiors of said plurality of rocket motors at increased velocity for simultaneous ignition thereof by said high temperature gas.

6. The ignition system recited in claim 2 wherein said plurality of rocket motors are supported by said plenum chamber and form a seal therewith about said plurality of conduits.

7. The combination recited by claim 6 wherein said plenum chamber is a fixed part of a launching pad for said plurality of rocket motors.

8. The combination recited in claim 2 wherein said plenum chamber includes at least one passage for venting excess high temperature gases therefrom.

References Cited by the Examiner

UNITED STATES PATENTS

| | | | |
|---|---|---|---|
| 1,113,498 | 10/1914 | Skoog | 158—115 |
| 2,110,217 | 3/1938 | Gardner et al. | 158—10 |
| 2,515,048 | 7/1950 | Lauritsen | 60—35.6 |
| 2,627,810 | 2/1953 | Catlin | 102—70 |
| 2,674,088 | 4/1954 | Riedel et al. | 60—39.82 |
| 2,683,963 | 7/1954 | Chandler | 60—35.6 |
| 2,872,870 | 2/1959 | Gey | 60—39.82 |
| 2,935,843 | 5/1960 | Haviland | 60—39.82 |
| 3,027,839 | 4/1962 | Grandy et al. | 102—27 |
| 3,031,842 | 5/1962 | Ledwith | 60—35.6 |
| 3,143,071 | 8/1964 | Arnold et al. | 102—70 |

FOREIGN PATENTS 74,261   10/1953   Netherlands.

MARK NEWMAN, *Primary Examiner.*

SAMUEL LEVINE, CARLTON R. CROYLE,
*Examiners.*